United States Patent
Montalva Rodríguez et al.

(10) Patent No.: US 11,202,990 B2
(45) Date of Patent: Dec. 21, 2021

(54) DECONTAMINATION PROCEDURE USING A BIOFILTER TO RETAIN AND RECYCLE PARTICULATE MATTER FROM COMBUSTION FUMES

(71) Applicant: Hidrosym S.A., Santiago (CL)

(72) Inventors: Anibal Montalva Rodríguez, Santiago (CL); Miguel Angel Fernández Donoso, Santiago (CL)

(73) Assignee: Hidrosym S.A., Santiago (CL)

( * ) Notice: Subject to any disclaimer, the term of this patent is extended or adjusted under 35 U.S.C. 154(b) by 767 days.

(21) Appl. No.: 15/760,112

(22) PCT Filed: Sep. 9, 2016

(86) PCT No.: PCT/CL2016/000052
§ 371 (c)(1),
(2) Date: Aug. 13, 2018

(87) PCT Pub. No.: WO2017/035678
PCT Pub. Date: May 9, 2017

(65) Prior Publication Data
US 2019/0009212 A1 Jan. 10, 2019

(30) Foreign Application Priority Data
Sep. 4, 2015 (CL) .................................. 2478-2015

(51) Int. Cl.
*B01D 53/85* (2006.01)
*B01D 53/74* (2006.01)
(Continued)

(52) U.S. Cl.
CPC ............... *B01D 53/85* (2013.01); *A01G 7/00* (2013.01); *A01G 7/02* (2013.01); *B01D 45/00* (2013.01);
(Continued)

(58) Field of Classification Search
CPC ........ B01D 45/00; B01D 45/18; B01D 53/00; B01D 53/34; B01D 53/74; B01D 53/84;
(Continued)

(56) References Cited

U.S. PATENT DOCUMENTS 4,049,569 A * 9/1977 Graat .................... B01D 53/00
252/372
4,070,300 A * 1/1978 Moroni .................. B01D 53/34
252/186.25
(Continued)

FOREIGN PATENT DOCUMENTS

CL 199301287 A 10/1994
CL 201200396 A 8/2012
(Continued)

OTHER PUBLICATIONS

International Searching Authority, International Search Report issued in related Application No. PCT/CL2016/000052, dated Dec. 30, 2016, 4 pp.
(Continued)

*Primary Examiner* — Tien Q Dinh
*Assistant Examiner* — Brady W Frazier
(74) *Attorney, Agent, or Firm* — Wood Herron & Evans LLP

(57) ABSTRACT

A fume decontamination system connected to any combustion system which comprises seven devices interconnected sequentially in the following manner: an extraction device is first connected to the combustion system and then connected by the other end to a guiding device which, in turn, is connected to a cooling device. Once cooled, the combustion gases are channeled to a suction device in which the gases are driven under pressure to an induction device which, in turn, concentrates the gases and directs same to the injection plenum, the concentrated, cooled gases being distributed at constant volumes to the entire biological plant filtering device and its decontamination procedure.

12 Claims, 13 Drawing Sheets

(51) Int. Cl.

| | |
|---|---|
| *B08B 15/00* | (2006.01) |
| *F01N 3/00* | (2006.01) |
| *B01D 53/34* | (2006.01) |
| *B01D 53/00* | (2006.01) |
| *B01D 53/84* | (2006.01) |
| *A01G 7/00* | (2006.01) |
| *F01N 3/021* | (2006.01) |
| *A01G 7/02* | (2006.01) |
| *B01D 45/00* | (2006.01) |
| *B01D 45/18* | (2006.01) |

(52) U.S. Cl.
CPC .............. *B01D 45/18* (2013.01); *B01D 53/00* (2013.01); *B01D 53/34* (2013.01); *B01D 53/74* (2013.01); *B01D 53/84* (2013.01); *B08B 15/00* (2013.01); *B08B 15/002* (2013.01); *F01N 3/00* (2013.01); *F01N 3/021* (2013.01); *Y02A 50/20* (2018.01)

(58) Field of Classification Search
CPC .. B01D 53/85; A01G 7/00; A01G 7/02; F01N 3/00; F01N 3/021; B08B 15/00; B08B 15/002; F24F 8/10
USPC ............................................. 47/66.7; 454/284
See application file for complete search history.

(56) References Cited

U.S. PATENT DOCUMENTS

| | | | |
|---|---|---|---|
| 4,163,430 A | 8/1979 | Neumann | |
| 4,892,719 A * | 1/1990 | Gesser .................. | B01D 53/34 423/245.1 |
| 5,397,382 A * | 3/1995 | Anderson ................ | A01G 9/02 96/135 |
| 6,006,471 A * | 12/1999 | Sun ....................... | A01K 63/006 47/69 |
| 6,117,672 A * | 9/2000 | Breckenridge ........ | B01D 53/85 435/266 |
| 2002/0104436 A1* | 8/2002 | Logstrup ............... | B01D 53/85 95/90 |
| 2007/0062112 A1* | 3/2007 | Stover .................... | A01G 9/00 47/59 R |
| 2009/0199539 A1* | 8/2009 | Maunula ............... | B01J 35/002 60/274 |
| 2012/0311991 A1* | 12/2012 | Mall ...................... | C10K 1/024 60/39.12 |
| 2013/0227884 A1* | 9/2013 | Park ...................... | A01G 9/025 47/66.6 |
| 2014/0318012 A1* | 10/2014 | Fujiyama ............... | A01G 9/249 47/62 R |
| 2015/0231548 A1* | 8/2015 | Lin .......................... | A61L 9/20 47/66.6 |

FOREIGN PATENT DOCUMENTS

| | | | | |
|---|---|---|---|---|
| ES | 2298737 T3 | 5/2008 | | |
| GB | 2297087 A | 7/1996 | | |
| JP | 2003112012 A | * 4/2003 | ............. | B01D 53/70 |

OTHER PUBLICATIONS

International Searching Authority, Written Opinion issued in related Application No. PCT/CL2016/000052 dated Dec. 28, 2016, 7 pp.
International Searching Authority, International Preliminary Report on Patentability issued in related Application No. PCT/CL2016/000052 dated Mar. 30, 2017, 33 pp.

* cited by examiner

DECONTAMINATION PROCEDURE USING A BIOFILTER TO RETAIN AND RECYCLE PARTICULATE MATTER FROM COMBUSTION FUMES

TECHNICAL FIELD OF THE APPLICATION

Decontamination system by extraction, cooling and filtering of fumes, adaptable to any combustion system of biomass and coal, that reduces the amount of particulate matter issued into the atmosphere.

SUMMARY OF THE INVENTION

This development refers to the use of a plant Biofilter to retain and treat the particulate matter contained in the gases coming from coal and biomass combustion devices, hereinafter "fumes". It consists mainly of a support structure, ducts, fume impulsion and extraction mechanisms, cooling system, plant material and organic elements used for the retention of particulate matter.

STATE OF THE ART

At present there are plant biofilter systems for the decontamination of the air.

The first biofilter to mention is a decontamination system for ambient air; when the air is guided through a substrate populated by microorganisms the pollutants present in the contaminated air become fixed and are degraded by the microorganisms inside the substrate layer.

This is a purification method for contaminated air, with a layer of soil that permits the passage of the air and with the possibility of cultivating plants in this substrate layer.

This invention (GB 2 297 097 A) can be implemented in different ways, provided the concept is the passage of contaminated air through a substrate layer in which the microorganisms handle degrading the contaminating components found in the air.

There is another patent of plant walls with internal circulation of air (WO 2012/085439 A1). This system is made up of superposed metal structures, obtaining a continuous substrate between these cells with networks of irrigation ducts and of air ducts within the plantation substrate. The air distribution network permits the circulation of the contaminated air, interior or exterior, driven by a ventilator to decontaminate this air once it encounters the substrate by a filtering effect to which the bacterial action is added according to the principle of the biofilter. This air distribution network, placed vertically within each cell consists, at least, of an air distribution plenum connected to a forced-air supply duct. This plenum must have an air diffusion window or grille in one of its two faces.

In both cases, the purpose or technical problem is filtering ambient air charged in atmospheric pollution. The end purpose of each one of these inventions is to decontaminate the air found in the atmosphere, guiding it through a plant biofilter through a ventilation system.

The purpose of this innovative development is to filter contaminated air generated by wood-burning stoves and fireplaces, without restricting it to these fumes only, connecting the ventilation system directly to the duct thereof. Therefore, the ventilation system must be able to move a volume of contaminated air that is greater, and has more pressure and flow than the above-described systems. Moreover, in the case of hot fumes, the device must contain a fume cooling system to be able to reach the plant biofilter at an adequate temperature and thus permit the growth of the plants and facilitate an optimum action of the microorganisms.

The system proposed is based on a derivation of the Patent (WO2012085439) GREEN WALL HAVING INTERNAL AIR CIRCULATION. The green wall consists of a structure made up of juxtaposed and/or superposed boxes; each box has a frame that supports a textile fabric or rigid plates. The boxes are filled with a planting substrate for the plants that grow on their front faces, at least. An air distribution network connected to a pump supplies air through the thickness of the boxes, and therefore, in the interior of the planting substrate. This network, placed vertically within each box, consists of an air distribution chamber connected to a forced-air supply duct, the impelling or plenum chamber has an air diffusion window or grid. The invention is applied to the production of a green wall for the decontamination of atmospheric air.

The vegetated walls in which the decontaminating system has been incorporated refer to the European Patent PT1771062 STRUCTURE FOR VEGETATED WALL. This invention is about a light, self-supporting wall with vegetation composed mainly of prismatic shaped boxes designed to be mounted juxtaposed and/or stacked. Each box includes lattice or mesh surfaces aligned internally and they are filled with a planting substrate. A network of water pipes and air outlets can be incorporated into the thickness of the structure, those networks pass through the separation lines between the boxes. The structure is designed for urban improvements, and to produce acoustic screens, partitions, billboards and the like. The advantage of a vegetated wall structure of this type is its modular nature that makes it easier to transport and install, while at the same time permitting its adaptation to each case of application and that it does not need to be fixed to a support wall. Moreover, it can easily be equipped with an internal irrigation network that can pass through the connection surfaces between adjacent compartments whether the faces are latticed or perforated in another way.

The issue then raised is the possible utilization of the Vegetated Wall (European Patent PT1771062) as a plant Biofilter (WO2012085439) adapted to filter combustion fumes. We shall define combustion fumes as the fumes generated by the combustion of biomass, coal, petroleum derivatives, pellets, among others. Specifically, the combustion sources that use fuels of plant origin (wood 25% humidity, pellets and the like) are of particular interest. The system functions by receiving and filtering fumes by means of fume ducts, cooler, extractor and impeller to an injection plenum (*), and then through a vegetated wall substrate, to retain and filter the particulate matter and the pollutants.

(*) The injection plenum is a closed space where air or other gases are stored at low speeds. The result of the design of this chamber is that the pressure of the gas introduced is distributed equally throughout the system's entire inner surface.

This system is defined in that it consists of seven parts interconnected sequentially for its operation. The process whereby it operates is also defined within the system.

This system consists of an extraction device (A) that consists of elements having a tubular section placed in the upper section of the fume outlet duct in such a way that they join and bifurcate them. Then, following the direction of the system, we have the conveyance device (B) that contains tubular section ducts, which conduct the hot air over the cover. These elements, separated from the cover, are anchored to the cover structure and they are sealed in each one of the unions to avoid seepages through the interstices and thus reduce the loss of flow on the way. This device also has registration elements. Following the path of the gases is the cooling device (C) where the fumes emitted by the wood combustion system travel via circular section ducts to enter the cooler, formed by tubular elements having a rectangular section smaller than that of the extraction tubes, so that the sum of the surface of its sides will be greater than the sum of the surfaces of the conveyance ducts, thus managing to reduce the temperature of the fumes by increasing the dissipation surface. On the other hand, the number of ducts, length and area of each section of the cooler is related in direct proportion with the distance to the capture point of the fumes. After cooling the gases, comes the suction device (D) that collects the fumes, which are at a low temperature due to the action of the coolant, suctioning them via an electromechanical system that increases their pressure and flow. The extractor of the suction device is regulable and is in direct proportion to the distance to the capture point of the fumes, height, diameter of the ducts and distance from the cooler (9). Subsequently the gases coming from the cooler are received and conveyed in a drive device (E) that corresponds to a box that includes circular ducts of a smaller diameter to increase the speed of the gases towards the injection plenum and thus to the plant biofilter. The process of transferring from the drive box is executed by means of ducts that have a section 1/10 of the path's duct (5, 8 and 10) which increases the injection speed into the plenum in 140%. The plenum (F) corresponds to a closed space where the fumes concentrate to be distributed uniformly in the plant biofilter. The pressure of the fumes introduced is stored in its entire internal surface and are incorporated constantly into the plant biofilter. Finally, in this circuit we find the plant biofilter (G) patent WO2012085439 where the fumes, when distributed uniformly in the substrate, are filtered and freed of suspended particles. All this sequence of devices can be seen clearly in FIG. 1/13.

The plenum (F) applied for the system has three possible configurations:

When the biofilter is self-sustaining, the configuration used is a lower plenum (FIG. 11/13).
When the biofilter is supported by a wall or another surface, there are two configurations, the side plenum and the lower plenum (FIG. 9/13).

For the biofilter to be able to respond to the offer of highly concentrated and contaminated material, a minimum surface (biofilter) and flow (fumes) relationship is required that is not described in the patent where the base structure for the treatment of atmospheric air (with highly diluted atmospheric contamination in comparison with that produced in a fireplace) is developed. This relationship of 390 m$^3$/hour for every m$^3$ of biofilter in the system was obtained in tests described later in the specification.

On the other hand, the filtering of the fumes requires reaching a biologically acceptable temperature. The fumes leave the duct at a temperature between 160° C. and 250° C. and reaches the biofilter at a temperature between 10° C. and 40° C.

On the other hand, this development seeks to protect the fume purification process itself. To do this, the process is divided into various stages:
 i) Capture process;
 ii) Conveyance;
 iii) Cooling;
 iv) Momentum and injection; and
 v) Plant filtration.

The fume capturing stage (i) is executed via a coupling (4), that, because of its design, splits the fumes and does not interfere in the normal operating process of the artefact that executes the combustion. In the second stage, conveyance (ii), the fumes travel and are conveyed at a constant speed, staying in ducts with regular sections (5, 8 and 10), in direction breaks (6) and through registration elements (7). The third stage, cooling (iii), takes place via a cooler (9). Here the fumes are distributed in as many sections as may be required to lower the temperature from 250° C. to 10° C. (so that the fumes are biologically suitable). The sum of the smaller sections is greater than that of the duct (5, 8 and 10); therefore, the travel speed is reduced in each section and as a result the time the fumes remain in an area of greater dissipation increases and, therefore, the temperature of the fumes drops without varying the flow per hour of the route. The number of ducts, longitude and area of each section of the cooler (9) is related in direct proportion to the distance to the point of capture (4) of the fumes. Because in this process the regulable (15) extractor (14) is in direct proportion to the distance to the point of capture (4), altitude, diameter of the ducts and distance from the cooler (9), the process it carries out is to balance, compensate and maintain the natural flow of the combustion system installed. At the same time, we have the fourth stage of the process, momentum and injection (iv), where the extractor (14) drives the gases to an injection box (16) that has a volume equivalent to one fourth of the cooler (9), and feeding at a constant speed increases the density of the air confined. The transfer process from the drive box (16) is carried out by means of ducts that have a section 1/10 of the travel duct (5; 8 and 10), which increases the injection speed into the plenum (19) in 140%. Finally, there is the fifth stage (v) of plant filtration where the use of a plant wall such as the one described in European patent PT1771062 is preferable. It should be noted that this development is not limited by the only forms of execution of this vegetated wall structure that have been described previously as an example; on the contrary, this one includes all the implementation and application variants that respect the same principle.

The plant filtration stage (v) does not produce waste, it absorbs and recycles the pollutants. This because part of the gases like carbon monoxide and dioxide acidify the irrigation water producing carbonic acid, which in turn improves the plants' capacity to absorb nutrients. Waste with products derived from sulfur and nitrogen are absorbed rapidly by the biofilter's roots improving plant growth, without an increase in water consumption. This is clearly visualized in FIG. 13/13.

Some specifications for the optimum operation of the system are:

Between points (4) and (14), with the purpose of maintaining efficiency, the tube distances range between 8 and 25 meters.

Between points (14) and (19), with the purpose of maintaining efficiency, the tube distances range between 0.2 and 7 meters.

On the other hand, the whole system works integrating the devices through a process linked to the previous and posterior element, that is, the interactions of the different devices are necessary so that the result of the total process takes place.

In general, the variables of gas temperature, flow and fuel used are relevant for the design and efficiency of the device. The result is a high efficacy in the fume filtering process with a greater percentage of retention of the polluting agents.

Particularly, they will not deviate from the scope of the invention, modifying details of its elements or resorting to other connection means and attachment of its elements, or employing other materials, or even adding particular accessories or provisions.

The technical problems that it is hoped this system will resolve are:

Achieve the reduction of the polluting particles originating from the fumes using a plant biofilter.

Achieve the dissipation of the fume temperature to be able to come into contact with a plant biofilter without destroying it.

Obtain a fume flow plant biofilter surface ratio that is efficient in the retention of fume particles.

Improve the growth of the plants of the biofilter by the concentrated entry of carbon-based nutrients (fumes).

Acidify the biofilter's substrate to better release nutrients from the plants it is made up of.

Filter the fumes produced with this system, with a minimum operative maintenance of same.

Obtain a process whereby the particles of the fumes can be removed with a minimum maintenance and in a manner that is environmentally friendly.

Figure 1:
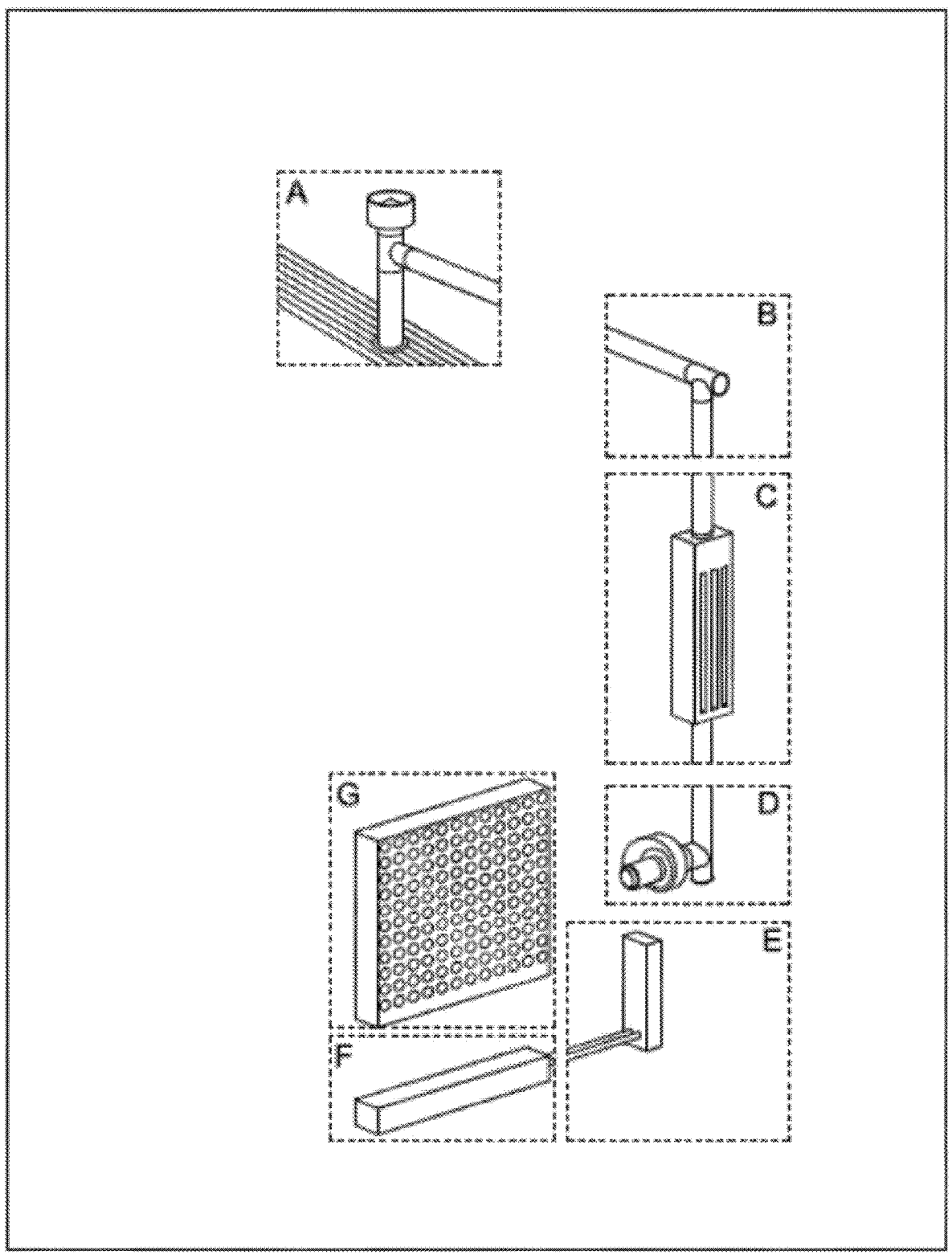
FIG. 1/13
Figure 2:
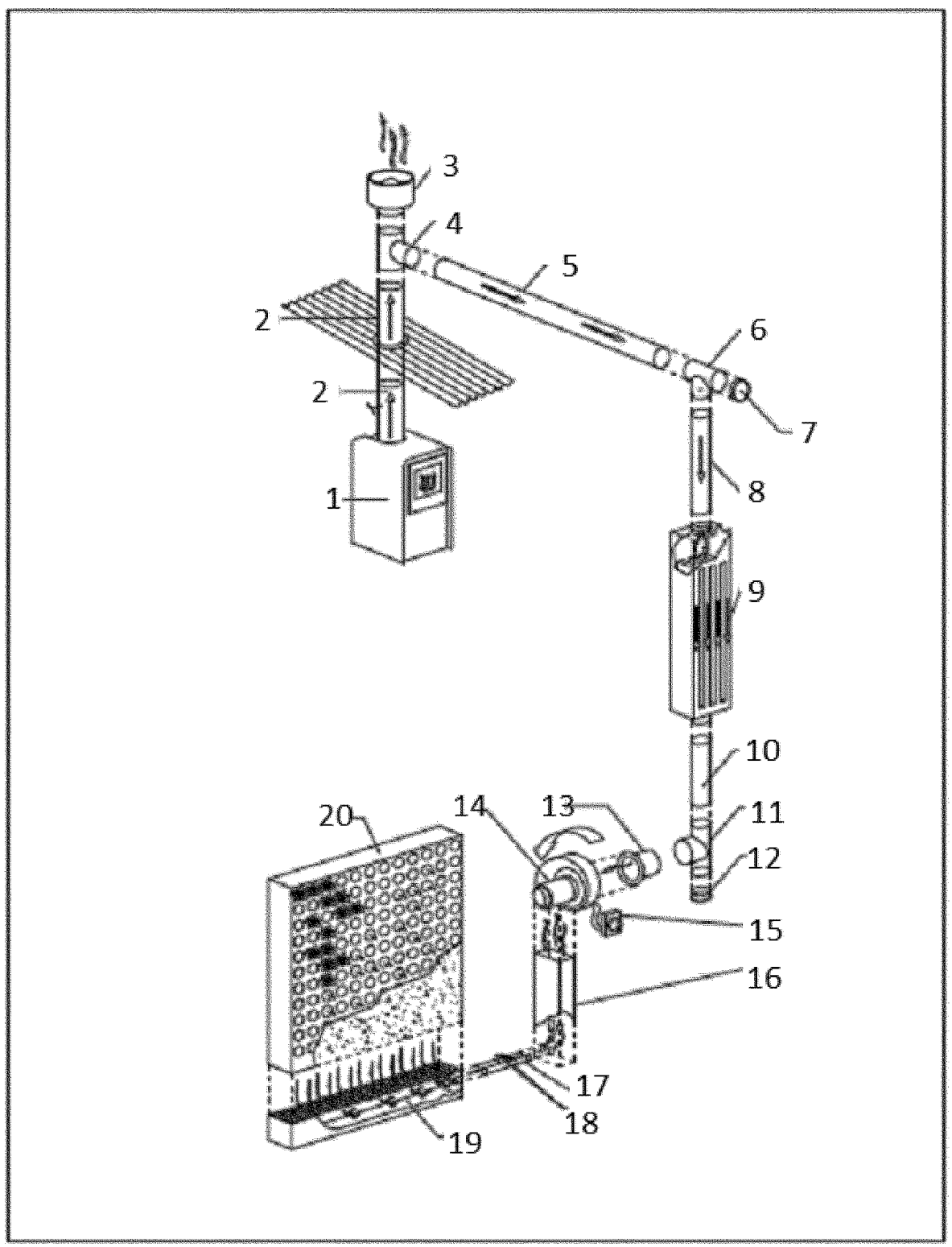
Figure 3:
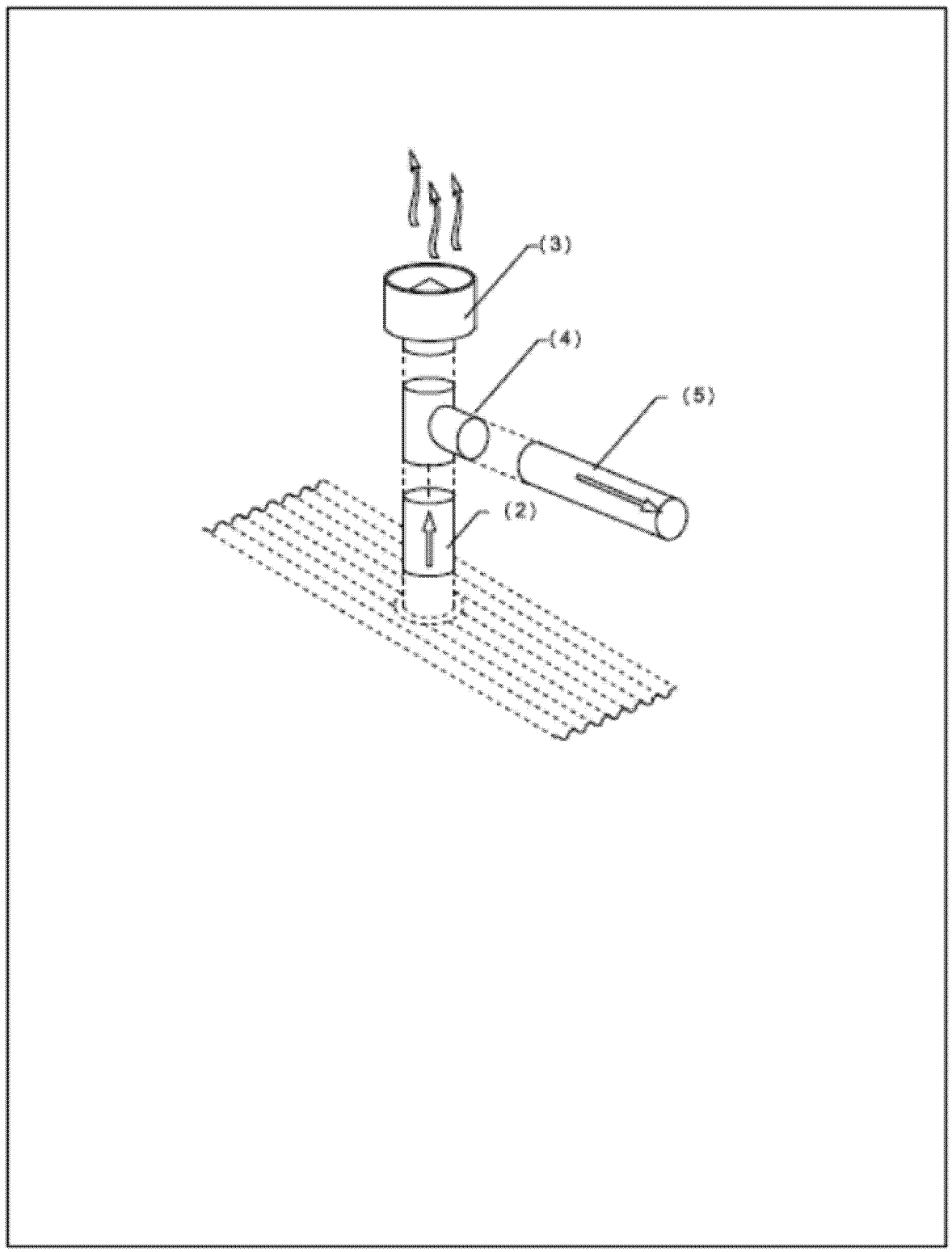
Figure 4:
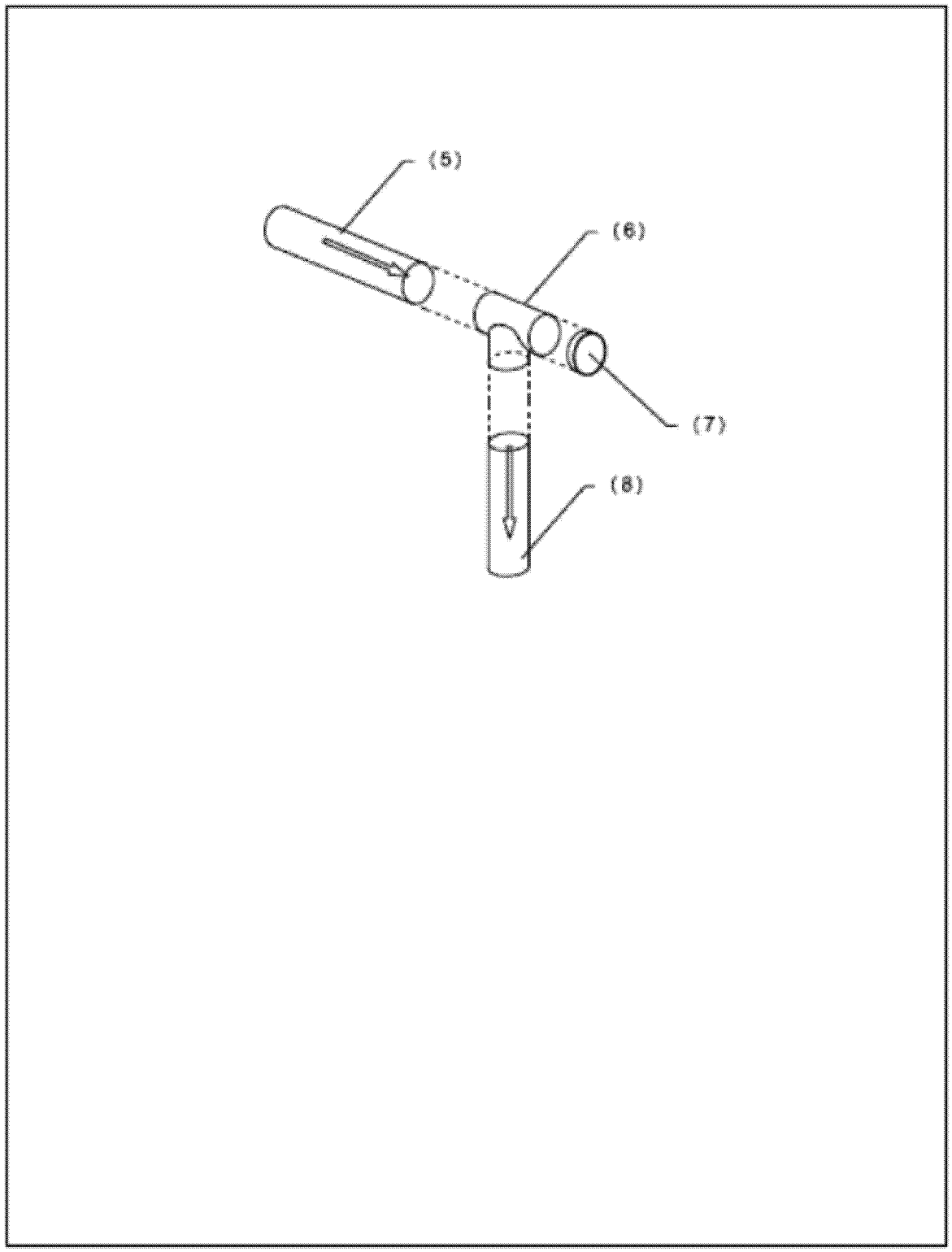
Figure 5:
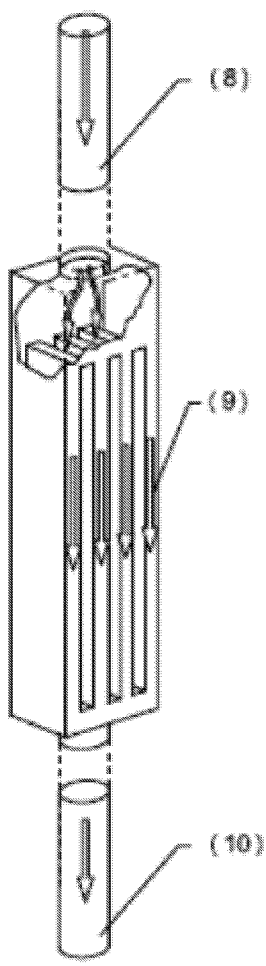
Figure 6:
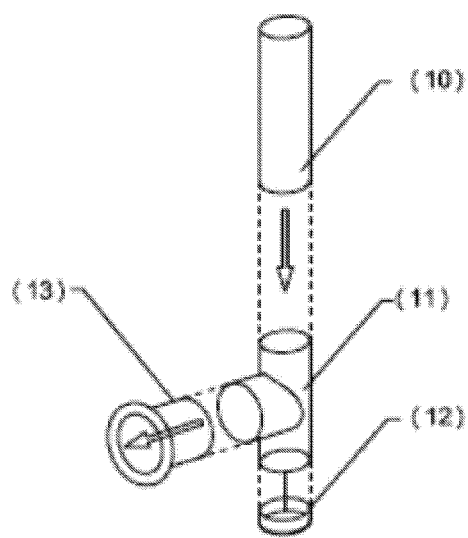
Figure 7:
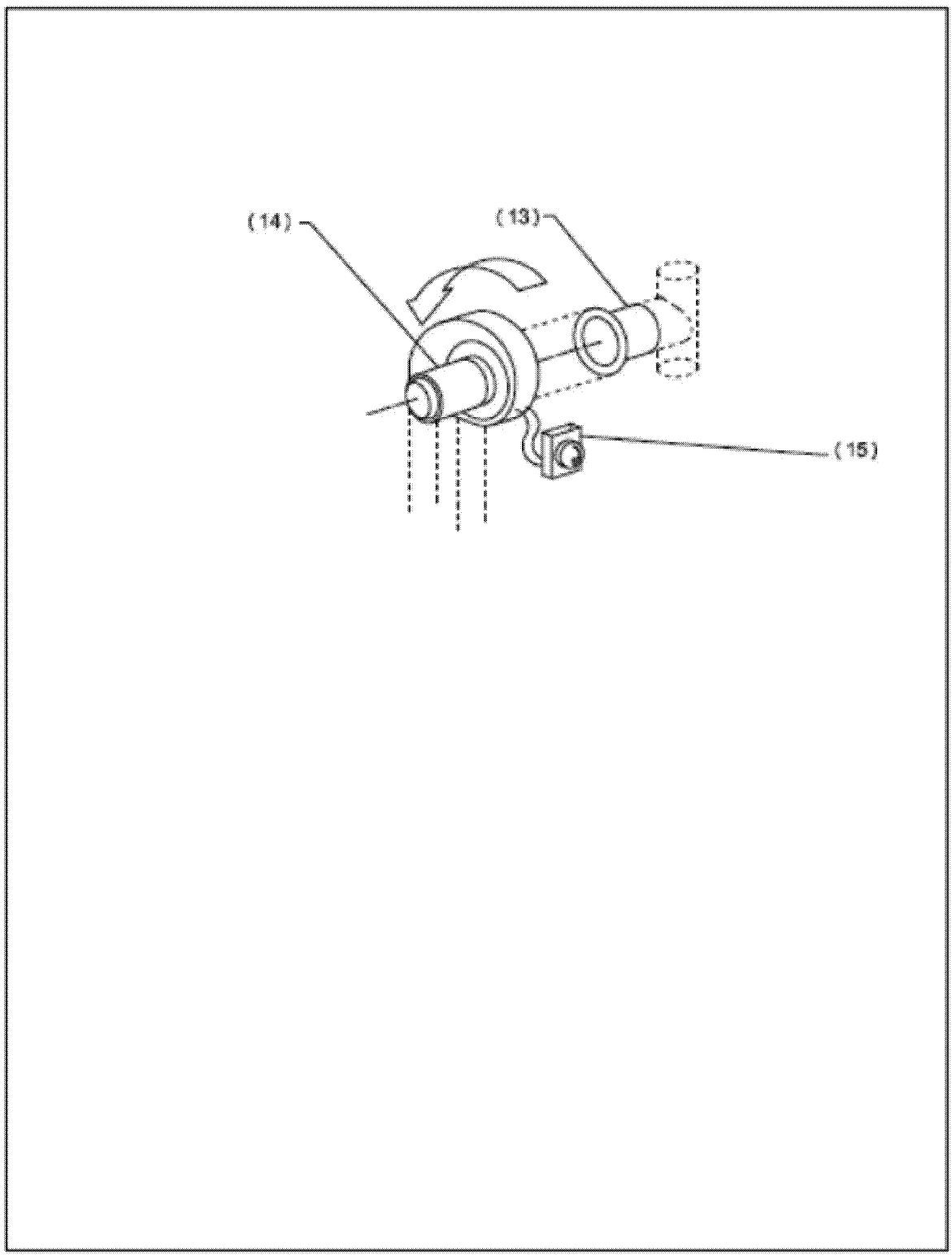
Figure 8:
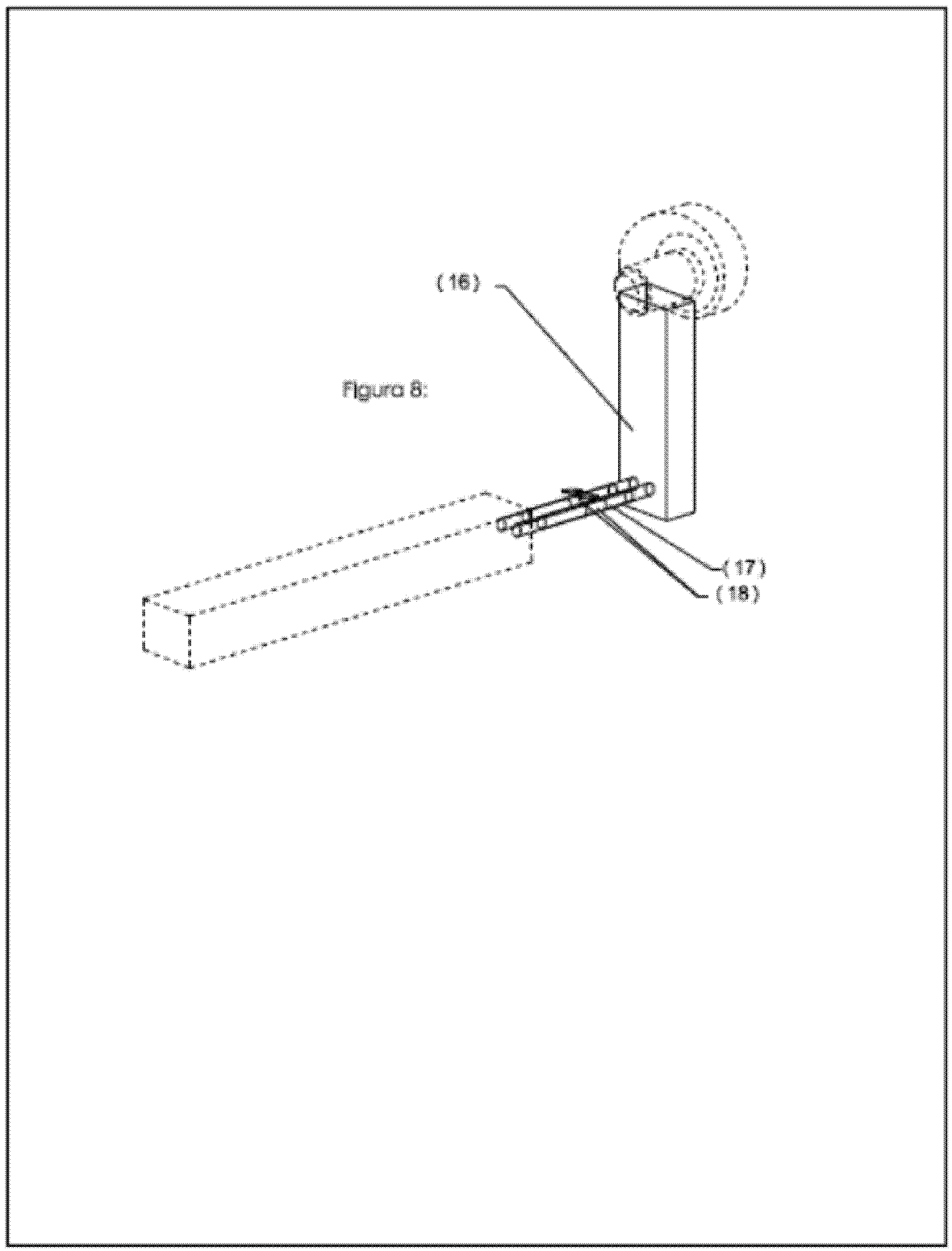
Figure 9:
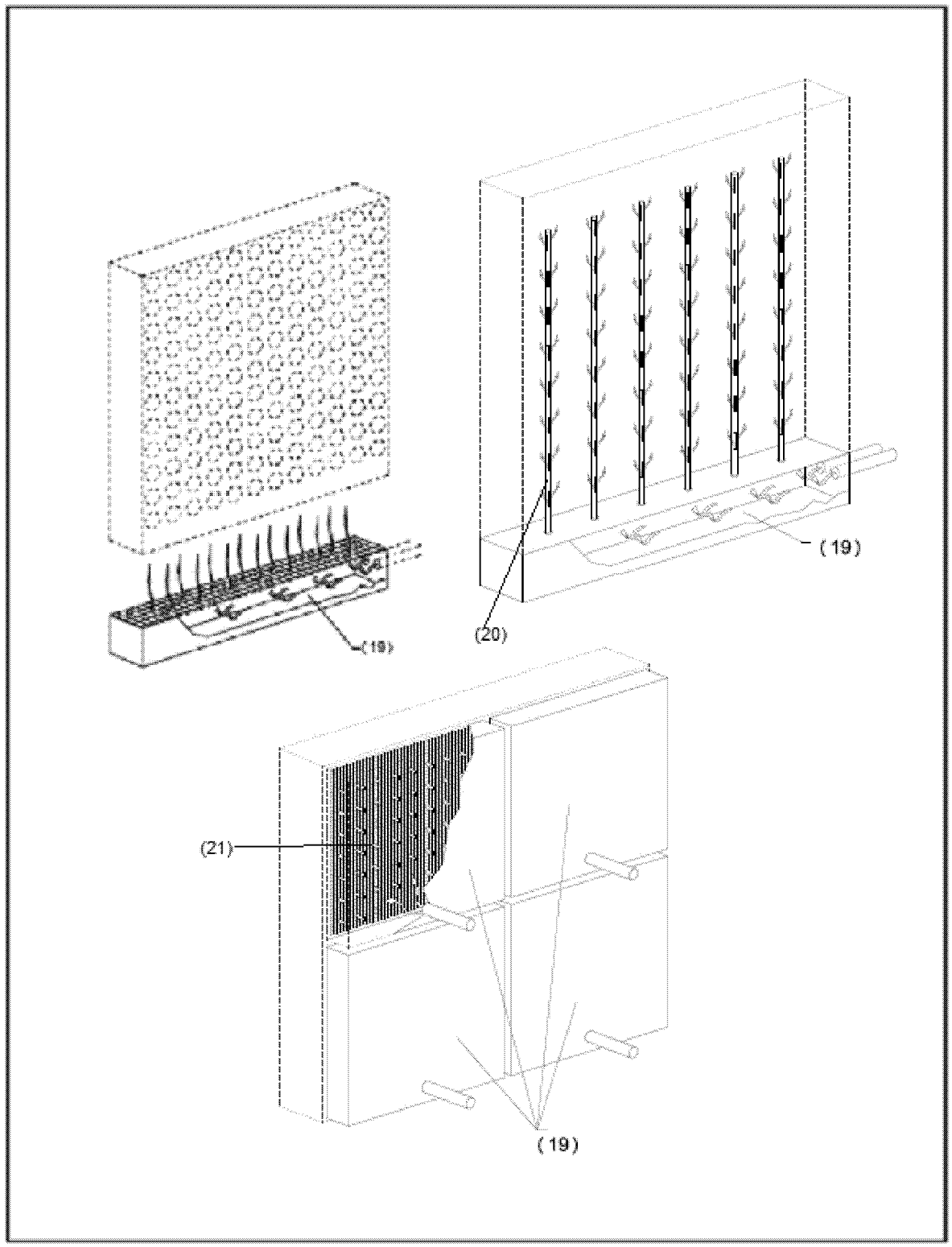
Figure 10:
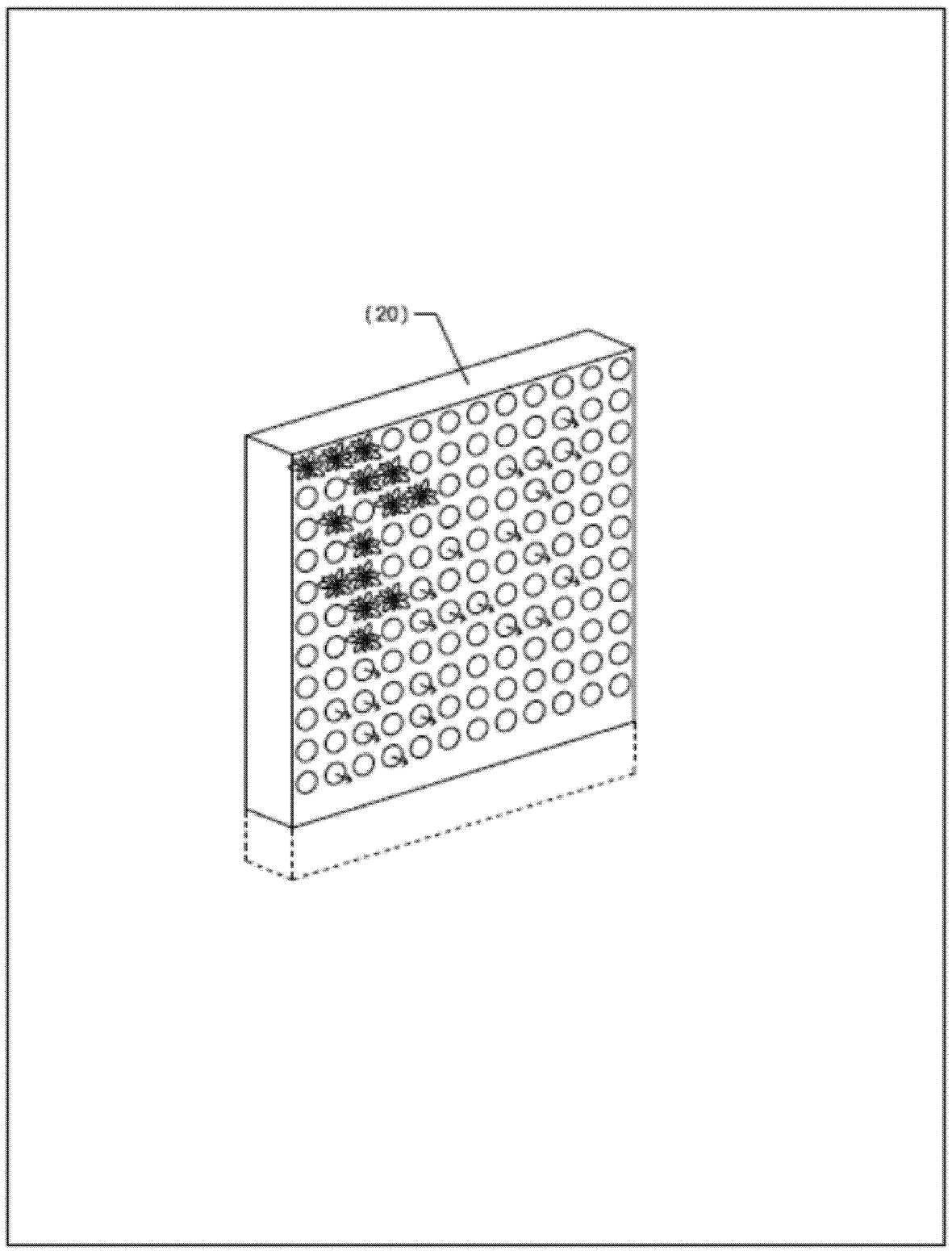
Figure 11:
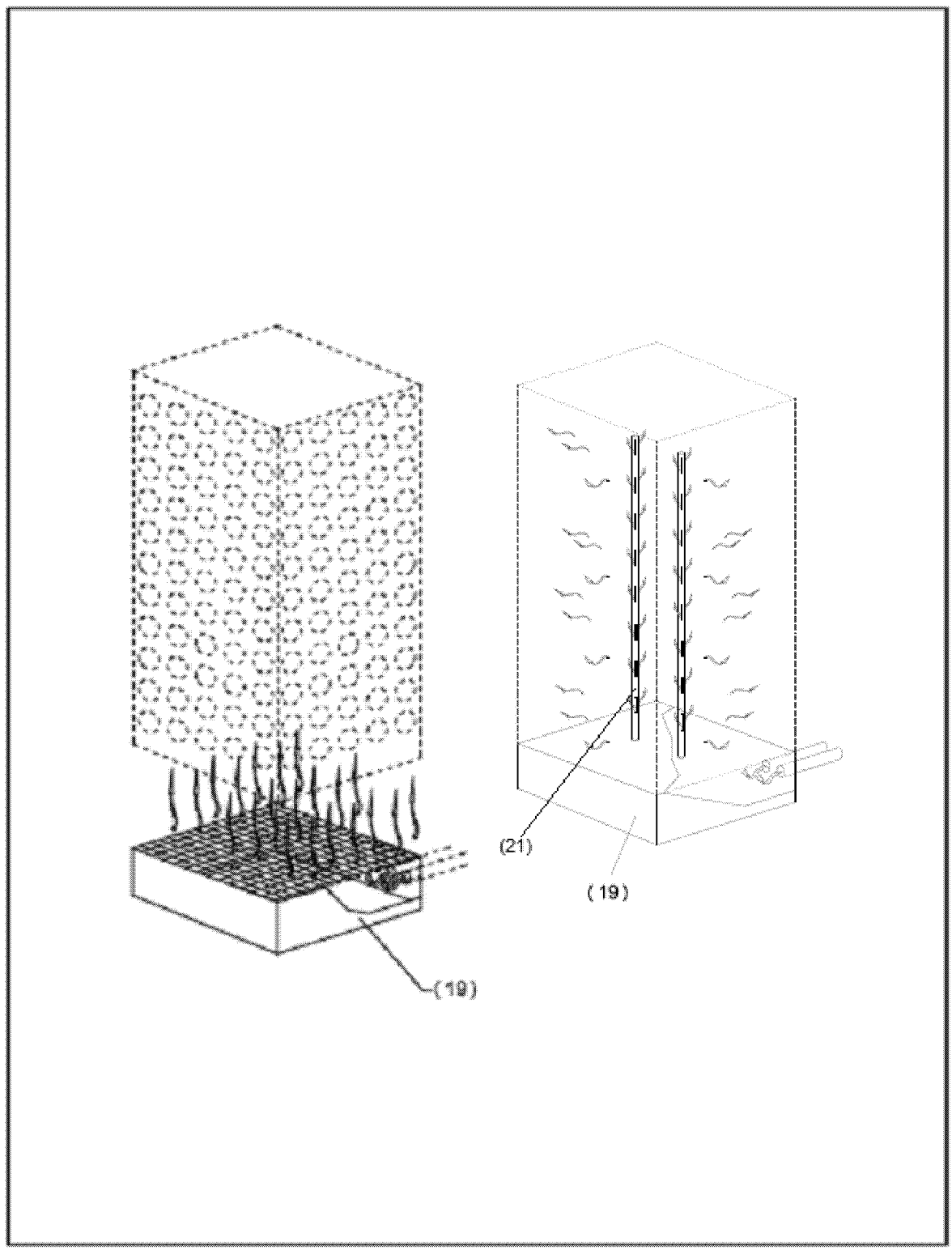
Figure 12:
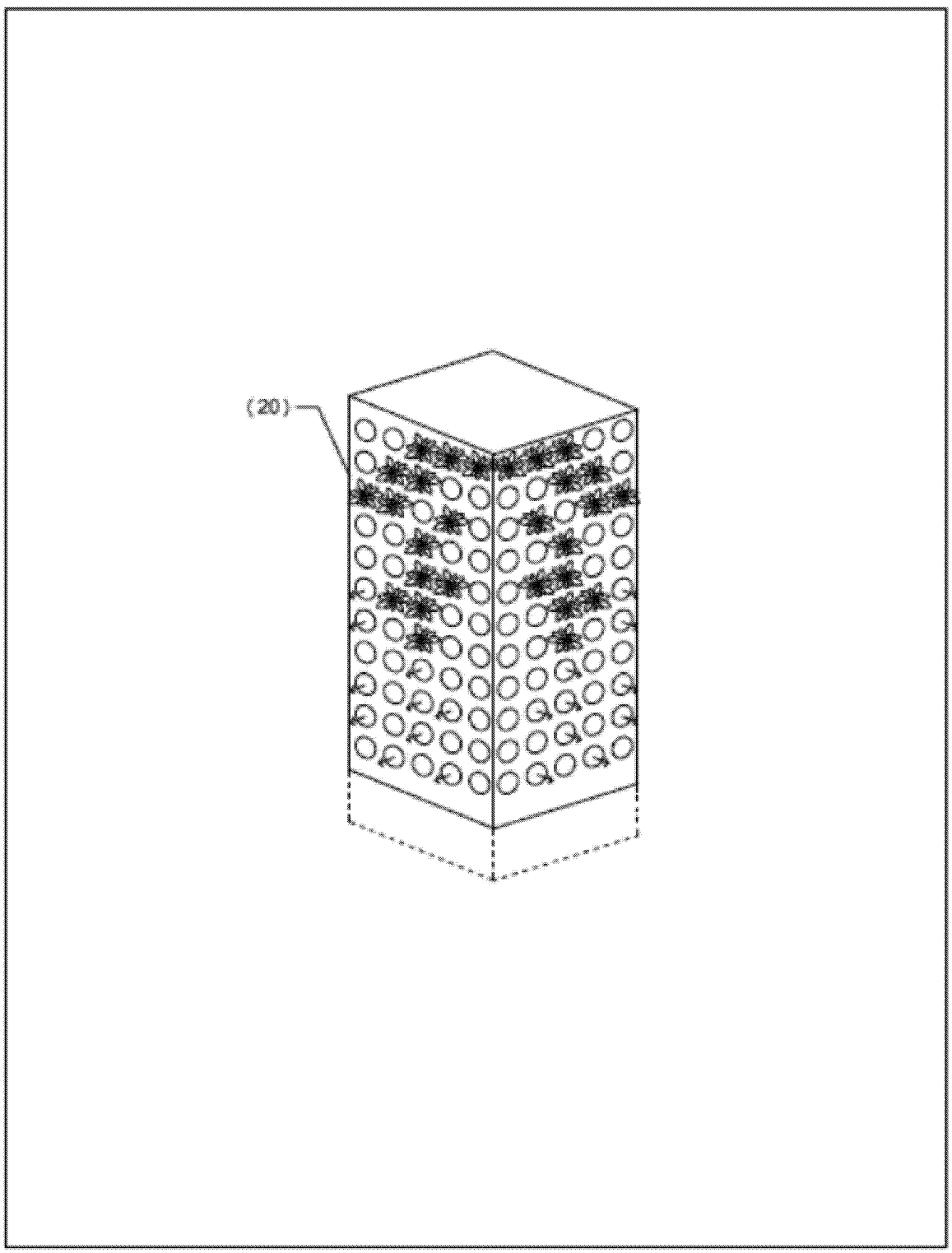

This figure represents a sketch of the system of this invention composed of seven devices according to FIG. 1/13.
A: extraction device
B: Conveyance device
C: Cooling device
D: Suction device
E. Induction device
F: Injection plenum and
G: Biological plant filtering device for the gases

FIG. 2/13

This figure presents a gas flow chart and its operation in the complete system. Also, the biofilter presented is one of the forms of execution of the vegetated wall structure without restricting it only to this.

In general, this figure also presents the fundamental parts of the different devices that make up the system and some necessary parts, outside the system, for an understanding of the system as a whole:

(1) Heater: refers to the original source of fume emissions, produced by the combustion of wood, pellets or the like.

(2) Gas outlet duct: refers to the outlet duct for the heater (1) that conveys the fumes towards the exterior of the premises and in its final section will be intervened by the extraction joint (4) so as to generate an alternative fume conveyance path towards the plant biofilter.

(3) Protection of the outlet duct: allows the correct exit of the fumes towards the exterior and protects the entire system (1 and 2) from the entry of water and other harmful elements.

The system itself consists of the following elements:

(4) Extraction connection: It is a T-shaped connector that creates a bifurcation to permit a flow of fumes, alternative to the original one. It consists of two intersected cylindrical ducts. The first duct maintains the continuity of the fume outlet duct (2), and must have the same diameter and be coupled correctly without seepages; the second duct conveys the fumes towards the plant biofilter. The extraction connection (4) can have a smoke sensor that activates the extractor (14) to start the system automatically.

(5) Conveyance Element: consists of a cylinder that conveys the fumes towards the TEE (gas derivation element) register [6]

(6) TEE register before the cooler (7) register cover before the cooler: The TEE register and the register cover, together, allow a change in direction of the conveyance of fumes in (5) and (8) and also the inspecting and cleaning of the section.

(8) The conveyance element prior to the cooler: conveys the gases from the TEE register (6) towards the cooler (9).

(9) The cooler: refers to a sealed element with only one input opening and another outlet for the gases. It consists of a connection to the conveyance element (8) and a derivation to a series of ducts having a rectangular section that separate and divide the flow of fumes with the purpose of reducing their temperature. In the final section of the element, regarding the direction in which the fumes advance, this group of ducts comes together again in a single rectangular-shaped chamber to become coupled, at a single point, to the conveyance element (10).

(10) Conveyance element after the cooler: conveys the gases from the cooler (9) towards the TEE register (11).

(11) The TEE register after the cooler: it consists of two intersected ducts. Combined with the register cover after the cooler (12), they permit a change of direction in the conveyance of fumes (10) towards the flange (13) and also inspect and clean the section.

(12) Register cover after the cooler.

(13) The flange is the element that joins the TEE register (11) with the extractor (14), allowing the dismantling of the latter without destructive operations, thanks to a circumference of perforations through which the stitch bolts are mounted.

(14) The extractor is an electro-mechanical equipment that suctions the gases coming from the heater (1) to drive them towards the plant Biofilter (18). Its action is controlled by means of a flow regulating electronic device (15). The extractor (14) is connected directly to the drive box (16).

(15) Electronic device that regulates flow.

(16) The drive box: consists of a sealed box with only one entry opening and a gas exit, it receives fumes and conveys them to the injection plenum (19) by means of conveyance elements (17).

(17) Conveyance elements: these are ducts that maintain the adequate pressure and flow for the entry of the fumes into the injection plenum (19), they are regulated manually by injection regulators (18).

(18) Injection regulators: these regulators control the flow that enters the injection plenum.

(19) The injection plenum: refers to a sealed chamber with an opening for the gas to enter and open on the side that connects with the plant Biofilter (20). The pressure of the gases that are introduced is spread equally throughout its internal surface and is integrated to the substrate in a constant manner.

(20) Plant Biofilter: this is a green wall that acts as a biological filter like the one described in European patent PT1771062. This does not limit the existence of other spatial arrangements, for example, self-supported, without leaning against a wall where they could be applied as a biofilter. What is substantial is to maintain a certain verticality of the biofilter so that the fumes will travel over a greater area of it.

FIG. 3/13

This figure presents the component elements of the extraction device where the movement of the flow of gases can be seen very clearly.

The numbers indicated in the figure are presented below:
(2) gas outlet duct
(3) protection of the outlet duct
(4) extraction coupling
(5) conveyance element

FIG. 4/13

This figure presents the component elements of the conveyance device where the movement of the flow of gases can be seen very clearly.

The numbers indicated in the figure are presented below:
(5) Conveyance element
(6) TEE register before the cooler
(7) register cover before the cooler
(8) conveyance element before the cooler

FIG. 5/13

This figure presents the elements that are components of the cooling device where the movement of the flow of gases can be seen clearly.

The numbers indicated in the figure are presented below:
(8) The conveyance element prior to the cooler
(9) The cooler
10) Conveyance element after the cooler.

FIG. 6/13

This figure presents the elements that are components of the suction device, clearly showing the movement of the flow of gases.

The numbers indicated in the figure are presented below:
(10) Conveyance element after the cooler.
(11) The TEE register after the cooler.
(12) Register cover after the cooler
(13) The flange

FIG. 7/13

This figure presents other elements that are components of the suction device, clearly showing the movement of the flow of gases.

The numbers indicated in the figure are presented below:
(13) The flange
(14) The extractor
(15) Electronic device that regulates the flow.

FIG. 8/13

This figure presents the elements that are components of the induction device where the movement of the flow of gases can be seen clearly.

The numbers indicated in the figure are presented below:
(16) The drive box
(17) Conveyance elements
(18) Injection regulators

FIG. 9/13

The figure on the upper left presents the component elements of the injection plenum, clearly showing the movement of the flow of gases.

The figure on the upper right presents the configuration of the biofilter supported on a structure that already exists; therefore, the plenum also presents a lower injection configuration, where the gases are distributed in the biofilter through the plenum's inner channels.

The inferior figure shows the second configuration of the plenum when the biofilter is sustained on an existing structure, where the position of the plenum is lateral and distributes the gases through a fabric especially suitable for these purposes.

The numbers indicated in the figure are presented below:
(19) The injection plenum
(21) Inner channels of the plenum
(22) Gas distribution fabric

FIG. 10/13

This figure presents the component elements of the plant biological filtering device in a configuration sustained on an existing wall or support, clearly showing the movement of the flow of gases.

The number indicated in the figure is presented below:
(20) Plant biofilter

FIG. 11/13

This figure presents, on the left, the component elements of the injection plenum, when the configuration of the plant biological filter is selfsustained with an inferior plenum, where the movement of the flow of gases can be seen very clearly.

On the other hand, the figure on the right presents the configuration of the plant biological filter when it is self-sustained showing the tubes that distribute the gas internally and that are part of the inferior plenum.

The number indicated in the figure is presented below:
(19) injection plenum
(21) Inner channels of the plenum

FIG. 12/13

This figure presents the component elements of the plant biological filtering device, in a self-sustained configuration in the same structure of the biological filter, where the moment of the flow of gases can be seen clearly.

The number indicated in the figure is presented below:
(20) Plant biofilter

FIG. 13/13

This figure presents two schematic drawings, the upper drawing presents the decontamination system operating for three months and the growth of the plants associated to the biofilter.

The lower drawing presents the biofilter alone, filtering environmental air, not connected to the decontamination system.

EXAMPLES OF APPLICATION

To prove the efficiency of the device, five pilot plants with similar characteristics and different measurements were installed. One of these pilot plants was taken as a reference, according to the following characteristics: the device was connected using an extraction coupling (4) at the gas outlet (2) from a double combustion Heater (1) of 8.8 kW, the measurement in kW refers to the original source of fume emissions, a product of biomass combustion among others.

Wood with a humidity equal to or of less than 17% was used for executing the tests, although this invention is not limited with regard to the humidity of the fuel.

The total journey of the fumes via the ducts is 14 m.

The system employed consists of:
An extraction coupling (4) that branches the fumes, installed at 6.00 m between the end of the gas outlet duct (2) and the outlet duct protection element (3).

It is conveyed above the 6 meters of duct (5) from the T coupling or bifurcation to the T register of section (6) and from this element by conveyance (8) five meters to the entry of the cooler (9), of 3 m² of dissipation surface and three routes.

The suction of the cooler's fumes (9) was executed by a medium pressure and simple aspiration centrifugal fan with housing and turbine with maximum flow of 1691 m³/h (14) and compressed in the drive box (15) of 0.04 m³ volume. The flow of the regime registered during the tests was 311 m³/h.

From the drive box (15), the fumes were injected into the 0.8 m³ plenum, whose function is to distribute homogeneously the entry of the fumes into the biofilter, in this case a 4 m² and 20 cm thick green wall.

Acidification of the substrate of the biofilter helping the liberation of nutrients towards the plants of the biofilter.

Improvements in the growth of the biofilter's plants maintaining the same amount of irrigation water.

The System's Data are Summarized in the Following Table I:

TABLE I

| System MFB 01 Type E20 | |
|---|---|
| Location: | Nahuelbuta Street 2047, Temuco |
| Dimension: | Biofilter 2.00 × 2.00 0.20 m |
| Volume: | Biofilter 0.8 m³ |
| Extraction length: | 14.00 m |
| Diameter of ducts: | Galvanized Ø 15.24 cm |
| Radiator: | Galvanized 3.2 m² area of dissipation |
| Heater model: | without brand, double chamber type. Slow combustion. |
| Extractor model: | Medium pressure and simple aspiration centrifugal fan with housing and turbine. |
| Maximum flow: | 1691 m³/h |
| Flow regime: | 311 m³/h |
| Sampling speed: | 1.2 m/s |
| Injection to plenum: | Independent, one per c/m² |
| Total volume plenum: | 0.8 m³ |
| Screen: | Stainless steel mesh 300 micras |
| Biofilter: | inert plant fiber |
| Fuel: | Wood |
| % Humidity: | 17% |

The experimental results observed during this test, according to the CH5 method (method used under Chilean rules to make measurements in fixed sources of gases) for determining the emissions of particles from stationary sources, were the following:

RESULTS OF THE MEASUREMENT
Biofilter No 1
Prior to the biofilter

| PARAMETER | C3 | C4 | C average | D |
|---|---|---|---|---|
| DATE | 13 Jul. 2015 | 13 Jul. 2015 | | |
| TIME | 13:40 | 15:00 | | |
| | 14:53 | 16:14 | | |
| Conc. of Particulate Matter (mg/m³N) | 652.40 | 432.48 | 542.44 | 155.51 |
| Corrected Conc. Particulate Matter (mg/m³N) | 652.40 | 432.48 | 542.44 | 155.51 |
| Hourly issuance | 0.20 | 0.14 | 0.17 | 0.05 |
| Standardized gas flow (m³N/h) | 314 | 314 | 314 | 0 |
| Excess of air (%) | | | | |
| % O₂ | 19.0 | 17.8 | 18.4 | 0.9 |
| % CO₂ | 1.7 | 1.7 | 1.7 | 0.0 |
| ppm CO | 3379.0 | 6000.0 | 4689.5 | 1853.3 |
| Isokinetism (%) | 96.9 | 97.8 | 97.4 | 0.6 |
| Humidity of the gases (%) | 1.2 | 1.3 | 1.3 | 0.1 |
| Speed of the gases (m/s) | 1.19 | 1.19 | 1.19 | 0.00 |
| Temperature of the bases (° C.) | 9.3 | 9.6 | 9.5 | 0.2 |

RESULTS OF THE MEASUREMENT
Biofilter No 1
Prior to the biofilter

| PARAMETER | C1 | C2 | C average | D |
|---|---|---|---|---|
| DATE | 13 Jul. 2015 | 13 Jul. 2015 | | |
| TIME | 10:40 | 12:05 | | |
| | 11.54 | 13:19 | | |
| Conc. of Particulate Matter (mg/m³N) | 53.95 | 16.94 | 35.44 | 26.18 |
| Corrected Conc. Particulate Matter (mg/m³N) | 53.95 | 16.94 | 35.44 | 26.18 |
| Hourly issuance | 0.02 | 0.01 | 0.01 | 0.01 |
| Standardized gas flow (m³N/h) | 314 | 313 | 313 | 1 |
| Excess of air (%) | | | | |
| % O₂ | 20.0 | 19.0 | 19.5 | 0.7 |
| % CO₂ | 0.0 | 1.7 | 0.9 | 1.2 |
| ppm CO | 6000.0 | 4000.0 | 5000.0 | 1414.2 |
| Isokinetism (%) | 99.6 | 96.9 | 98.3 | 1.9 |
| Humidity of the gases (%) | 1.3 | 1.1 | 1.2 | 0.1 |
| Speed of the gases (m/s) | 1.20 | 1.20 | 1.20 | 0.00 |
| Temperature of the bases (° C.) | 10.9 | 11.8 | 11.3 | 0.6 |

Performance Biofilter No 1 = 93.47%
Date: 13 Jul. 2015
Address: Nahuelbuta 2047
(*) Final results The results of these tests clearly indicate a performance greater than 90%, preferably 93.47%, where the reduction of different emissions was achieved and especially the particulate material.

In general, the results of five of the experiments gave a range of efficiency in particulate material retention of between 72 to 95%.

The flow of filtered fumes operative in the different tests goes from 300 m³/h to 500 m³/h; these flow values do not restrict the current development.

An interesting result is the relationship that each 390 m³/h flow in regime of smoke requires 1 m³ of biofilter and was confirmed for the range between 216 to 512 m³/h of flow in regime of smoke with an equivalent range of biofilter volume between 0.55 to 1.32 m³ to achieve a filtering with an efficiency above 90%. These values are not restrictive to other flows in which the system could be applied.

Figure 13:
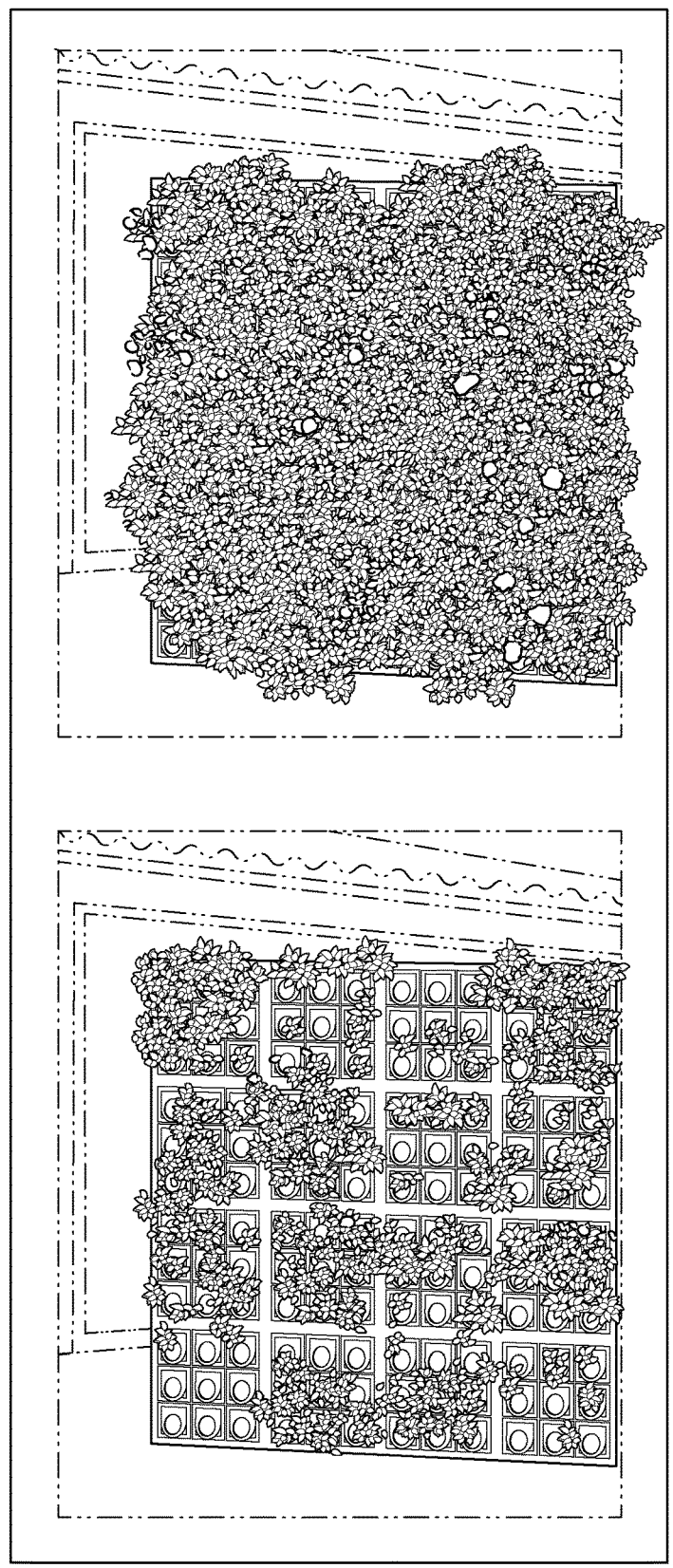

A second experiment demonstrated the efficiency in the growth of the biofilter depending on the injection of the fumes from the combustion devices (FIG. 13/13).

The smoke coming out of the chimney had a flow of 390 m³/h. On the other hand, the experiment was carried out for three winter months.

In this experiment, a biofilter was used, mounted on a wall with a volume of the same m³, with a lateral injection plenum.

One of the phenomenon detected in this test was the rapid acidification of the soil by the generation of carbonic acid when the carbon monoxide of the products derived from the combustion came into contact with the irrigation water. This phenomenon causes the roots to be more exposed to the absorption of nutrients necessary for their growth.

The invention claimed is:

1. A fume decontamination procedure in connection with any combustion system of biomass and/or coal, CHARACTERIZED in that the fume decontamination procedure comprises the steps of:
   i) capturing smoke from the combustion system;
   ii) guiding the smoke at a constant speed through a regular section (5, 8 and 10);
   iii) cooling the smoke, wherein the smoke is distributed in a cooler (9) having lower sections, where the temperature is between 10° C. and 40° C. in the cooler and a flow of the smoke decelerates in each lower section relative to a flow of the smoke in the regular section;
   iv) injecting the cooled smoke into an injection box (16) thereby increasing a density of the smoke within the injection box relative to a density of the smoke in the cooler;
   v) transferring the smoke from the injection box (16) through ducts having a 1/10 cross section of the regular section (5, 8 and 10) and into a plenum (19), wherein transferring into the plenum increases the flow speed of the smoke by 140% relative to the flow speed of the smoke in the cooler (9); and
   vi) filtering particulate material from the smoke through a vertical wall of vegetation, wherein the smoke travels a contact surface with the vertical wall of vegetation, the vegetation capturing and absorbing the filtered particulate material.

2. The fume decontamination procedure according to claim 1, CHARACTERIZED in that the vertical wall of vegetation has a particle filtration performance of greater than 90% reduction in particulates.

3. The fume decontamination procedure according to claim 1, CHARACTERIZED in that injecting the cooled smoke includes regulating the flow of the smoke through an extractor (14) that receives flow orders from an electronic flow regulator device (15).

4. The fume decontamination procedure according to claim 1, CHARACTERIZED in that (iii) cooling the smoke includes reducing the temperature of the smoke from 250° C. to 10° C.

5. The fume decontamination procedure according to claim 1, CHARACTERIZED in that vi) filtering the smoke with the vertical wall of vegetation produces carbonic acid improving growth of the vertical wall of vegetation.

6. The fume decontamination procedure according to claim 1, CHARACTERIZED in that capturing smoke includes capturing smoke in a range of 216 to 512 $m^3/h$ and filtering particular material includes the vertical wall of vegetation having a volume in a range of 0.55 to 1.32 $m^3$ and an efficiency over 90% of particulate material is removed.

7. The fume decontamination procedure according to claim 1 wherein vi) filtering includes passing the particulate material through a self-supporting vertical wall of vegetation.

8. The fume decontamination procedure according to claim 1 wherein vi) filtering includes passing the particulate material through the vertical wall of vegetation supported on a structure.

9. The fume decontamination procedure according to claim 1 wherein the lower sections consist of a series of ducts and during cooling, the smoke is separated into each duct of the series of ducts, and following separating and before injecting, the procedure further comprises combining the separated flows from each duct in the series of ducts into a single flow.

10. The fume decontamination procedure according to claim 9 wherein during cooling, a sum of the cross sectional areas of each duct in the series of ducts is greater than a cross sectional area of the regular section.

11. The fume decontamination procedure according to claim 9 wherein following separating and before combining, reducing the smoke travel speed in each duct in the series of ducts from the constant speed in the regular section.

12. The fume decontamination procedure according to claim 1 wherein the injection box has a volume that is one fourth a volume of the cooler and wherein injecting includes driving the cooled smoke into the injection box to increase the density of the cooled smoke.

\* \* \* \* \*

UNITED STATES PATENT AND TRADEMARK OFFICE
CERTIFICATE OF CORRECTION

PATENT NO. : 11,202,990 B2
APPLICATION NO. : 15/760112
DATED : December 21, 2021
INVENTOR(S) : Montalva Rodriguez et al.

It is certified that error appears in the above-identified patent and that said Letters Patent is hereby corrected as shown below:

In the Specification

Column 3, Lines 29-30, "which increases the injection speed into the plenum in 140%." should be --which increases the injection speed into the plenum by 140%.--.

Column 3, Lines 56-58, "The fumes leave the duct at ... and reaches the biofilter at a temperature between" should be --The fumes leave the duct at ... and reach the biofilter at a temperature between--.

Column 4, Lines 18-19, "The number of ducts, longitude and area of each section of the cooler (9) is related" should be --The number of ducts, longitude and area of each section of the cooler (9) are related--.

Column 4, Lines 33-34, "which increases the injection speed into the plenum (19) in 140%." should be --which increases the injection speed into the plenum (19) by 140%.--.

Column 4, Lines 46-47, "Waste with products derived from ... and ... are absorbed rapidly by the" should be --Waste with products derived from ... and ... is absorbed rapidly by the--.

Column 10, Line 4, [table], "Prior to the biofilter" should be --After the biofilter--.

In the Claims

Column 12, Line 8, Claim 6, "filtering particular material includes" should be --filtering particulate material includes--.

Signed and Sealed this
Twenty-sixth Day of April, 2022

Katherine Kelly Vidal
*Director of the United States Patent and Trademark Office*